US011009079B2

(12) United States Patent
Torii et al.

(10) Patent No.: US 11,009,079 B2
(45) Date of Patent: May 18, 2021

(54) VEHICLE DRIVE APPARATUS

(71) Applicants: AISIN AW CO., LTD., Anjo (JP); TOYOTA JIDOSHA KABUSHIKI KAISHA, Toyota (JP); AISIN AW INDUSTRIES CO., LTD., Echizen (JP)

(72) Inventors: Takeshi Torii, Chiryu (JP); Daisuke Yamaoka, Anjo (JP); Atsushi Okuda, Echizen (JP); Tetsuya Yamauchi, Sabae (JP); Atsushige Kawasaka, Echizen (JP); Masashi Ikemura, Toyota (JP); Yosuke Michikoshi, Toyota (JP)

(73) Assignees: AISIN AW CO., LTD., Anjo (JP); TOYOTA JIDOSHA KABUSHIKI KAISHA, Toyota (JP); AISIN AW INDUSTRIES CO., LTD., Echizen (JP)

( * ) Notice: Subject to any disclaimer, the term of this patent is extended or adjusted under 35 U.S.C. 154(b) by 461 days.

(21) Appl. No.: 15/570,791

(22) PCT Filed: Jun. 30, 2016

(86) PCT No.: PCT/JP2016/069555
§ 371 (c)(1),
(2) Date: Oct. 31, 2017

(87) PCT Pub. No.: WO2017/002948
PCT Pub. Date: Jan. 5, 2017

(65) Prior Publication Data
US 2018/0119746 A1    May 3, 2018

(30) Foreign Application Priority Data
Jun. 30, 2015    (JP) .............................. JP2015-132225

(51) Int. Cl.
*F16H 57/00* (2012.01)
*F16H 57/12* (2006.01)
(Continued)

(52) U.S. Cl.
CPC ............. *F16D 3/50* (2013.01); *F16D 1/0835* (2013.01); *F16D 13/58* (2013.01); *F16H 3/663* (2013.01);
(Continued)

(58) Field of Classification Search
CPC ..... F16D 3/18; F16D 3/52; F16D 3/64; F16D 3/68; F16D 3/725; F16D 3/74; F16D 3/76;
(Continued)

(56) References Cited

U.S. PATENT DOCUMENTS 4,793,200 A * 12/1988 McDonald .......... F16H 57/0006
74/331
2006/0046858 A1* 3/2006 Brissette ............... F16D 1/0835
464/51

FOREIGN PATENT DOCUMENTS

JP    H10-47494 A    2/1998
JP    2002-101608 A    4/2002
(Continued)

OTHER PUBLICATIONS

International Search Report for PCT/JP2016/069555 dated Sep. 27, 2016 [PCT/ISA/210].

*Primary Examiner* — Charles A Fox
*Assistant Examiner* — Ryan P Dodd
(74) *Attorney, Agent, or Firm* — Sughrue Mion, PLLC

(57) ABSTRACT

A vehicle drive apparatus includes: a sleeve including a first peripheral surface provided side by side with a spline; a connecting member including a groove provided side by side with a spline in spline engagement with the spline,
(Continued)

recessed radially relative to the first peripheral surface, and including a bottom surface that serves as a second peripheral surface facing the first peripheral surface; and a tolerance ring disposed in the groove so as to exert a radial elastic force between the sleeve and the connecting member.

14 Claims, 8 Drawing Sheets

(51) Int. Cl.
| | |
|---|---|
| *F16D 3/50* | (2006.01) |
| *F16H 3/66* | (2006.01) |
| *F16H 57/08* | (2006.01) |
| *F16D 1/08* | (2006.01) |
| *F16D 13/58* | (2006.01) |
| *F16D 3/76* | (2006.01) |
| *F16C 33/74* | (2006.01) |

(52) U.S. Cl.
CPC ......... *F16H 3/666* (2013.01); *F16H 57/0006* (2013.01); *F16H 57/08* (2013.01); *F16H 57/12* (2013.01); *F16C 33/74* (2013.01); *F16D 3/76* (2013.01); *F16H 2057/0012* (2013.01); *F16H 2057/126* (2013.01); *F16H 2200/006* (2013.01); *F16H 2200/0086* (2013.01); *F16H 2200/201* (2013.01); *F16H 2200/2023* (2013.01); *F16H 2200/2025* (2013.01); *F16H 2200/2046* (2013.01); *F16H 2200/2066* (2013.01); *F16H 2200/2082* (2013.01); *F16H 2200/2097* (2013.01)

(58) Field of Classification Search
CPC .. F16H 57/12; F16H 57/0006; F16H 57/0012; F16H 2047/126; F16C 33/74
See application file for complete search history.

(56) References Cited

FOREIGN PATENT DOCUMENTS

| | | | |
|---|---|---|---|
| JP | 2003-113918 A | 4/2003 | |
| JP | 2003113918 A * | 4/2003 | |
| JP | 2005-047340 A | 2/2005 | |
| JP | 2009-222186 A | 10/2009 | |
| JP | 2011-214646 A | 10/2011 | |
| JP | 2011214646 A * | 10/2011 | ............. F16D 1/101 |
| JP | 2013-190026 A | 9/2013 | |
| JP | 2014-101924 A | 6/2014 | |
| JP | 2015-045398 A | 3/2015 | |
| WO | 2013/164889 A1 | 11/2013 | |

* cited by examiner

|  | C-1 | C-2 | C-3 | C-4 | B-1 | B-2 | F-1 |
|---|---|---|---|---|---|---|---|
| 1ST | ○ |  |  |  |  | (○) | ○ |
| 2ND | ○ |  |  |  | ○ |  |  |
| 3RD | ○ |  | ○ |  |  |  |  |
| 4TH | ○ |  |  | ○ |  |  |  |
| 5TH | ○ | ○ |  |  |  |  |  |
| 6TH |  | ○ |  | ○ |  |  |  |
| 7TH |  | ○ | ○ |  |  |  |  |
| 8TH |  | ○ |  |  | ○ |  |  |
| Rev1 |  |  | ○ |  |  | ○ |  |
| Rev2 |  |  |  | ○ |  | ○ |  |

VEHICLE DRIVE APPARATUS

CROSS REFERENCE TO RELATED APPLICATIONS

This application is a National Stage of International Application No. PCT/JP2016/069555 filed Jun. 30, 2016, claiming priority based on Japanese Patent Application No. 2015-132225 filed Jun. 30, 2015, the contents of all of which are incorporated herein by reference in their entirety.

TECHNICAL FIELD

This technique relates to vehicle drive apparatuses.

BACKGROUND ART

A related art vehicle-mounted vehicle drive apparatus includes splined rotational members that are in spline engagement with each other and coupled to each other in a drivable manner. One of the spline-engaged rotational members receives a thrust load from a sun gear etc. that is included in a planetary gear, for example. This rotational member is provided with a thrust bearing to receive the thrust load so as to stably rotate and drive the rotational member (see Patent Document 1).

RELATED ART DOCUMENT

R

Patent Document

Patent Document 1: Japanese Patent Application Publication No. 2014-101924 (JP 2014-101924 A)

SUMMARY

Problem to be Solved by the Invention

The structure described in Patent Document 1 includes a spline engagement portion formed by spline engagement between a splined portion of a second sun gear and a splined portion of the rotational member coupled to a third clutch and a fourth clutch.

At the spline engagement portion between the rotational members, splines formed on the rotational members usually have a gap therebetween. Thus, the spline-engaged rotational members of the vehicle-mounted drive apparatus vibrate owing to explosive vibration of an engine, for example. This unfortunately leads to generation of sounds. The generation of sounds becomes more and more noticeable as the rotational members of the vehicle-mounted vehicle drive apparatus are reduced in weight.

Accordingly, an object of the exemplary embodiment is to provide a vehicle drive apparatus capable of decreasing backlash between spline-engaged rotational members so as to reduce generation of sounds.

Means for Solving the Problem

A vehicle drive apparatus according to the various aspects of application provide:
a first rotational member including a first spline, and a first peripheral surface provided axially side by side with the first spline;
a second rotational member including a second spline in spline engagement with the first spline so as to provide a spline engagement portion, and a groove provided axially side by side with the second spline, recessed radially relative to the first peripheral surface, and including a bottom surface that is located between a first lateral surface and a second lateral surface facing the first lateral surface and that serves as a second peripheral surface radially facing the first peripheral surface; and
an elastic member disposed in the groove so as to exert a radial elastic force between the first rotational member and the second rotational member.

The elastic member produces circumferential frictional resistance between the first peripheral surface and the second peripheral surface by the elastic force.

Effects of the Embodiments

The second rotational member of the vehicle drive apparatus is provided with: the spline engagement portion that provides spline engagement between the first rotational member and the second rotational member; and the groove in which the elastic member to provide engagement between the first rotational member and the second rotational member is disposed. The elastic member is in frictional contact with the second peripheral surface that is the bottom surface of the groove and the first peripheral surface of the first rotational member. Thus, the rotational members that come into spline engagement with each other are engageable with each other by the elastic member. This makes it possible to decrease backlash so as to reduce generation of sounds, and enables axial positioning of the elastic member when the elastic member is disposed in the groove.

DETAILED DESCRIPTION OF THE PREFERRED EMBODIMENTS

First Embodiment

A first embodiment will be described below with reference to FIGS. 1 to 4. A vehicle drive apparatus according to the exemplary embodiment is suitably mounted on an FF (front engine/front drive) type vehicle, for example. The right and left directions in FIGS. 1 and 3 respectively correspond to the right and left directions (or the left and right directions) when the vehicle drive apparatus is actually mounted on a vehicle. For the sake of convenience of description, the right side of FIGS. 1 and 3 adjacent to a driving source, such as an engine, for example, will be referred to as a "front side" or "second axial side", and the left side of FIGS. 1 and 3 will be referred to as a "rear side" or "first axial side".

Figure 1:
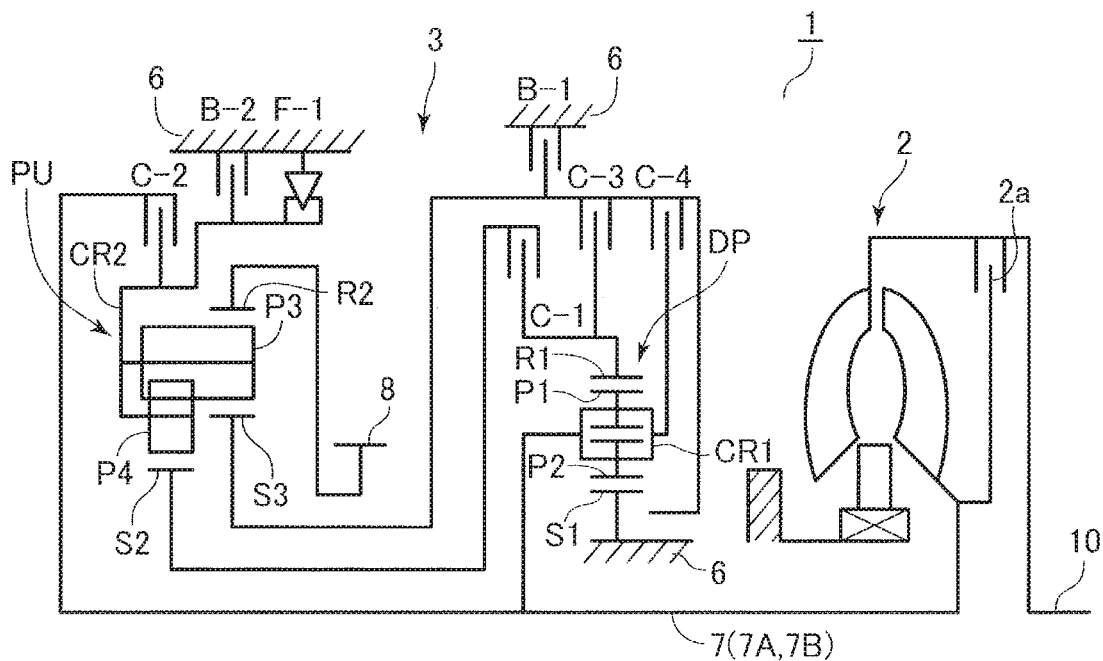
FIG. 1 is a skeleton diagram schematically illustrating an automatic transmission according to a first embodiment.
Figure 1:
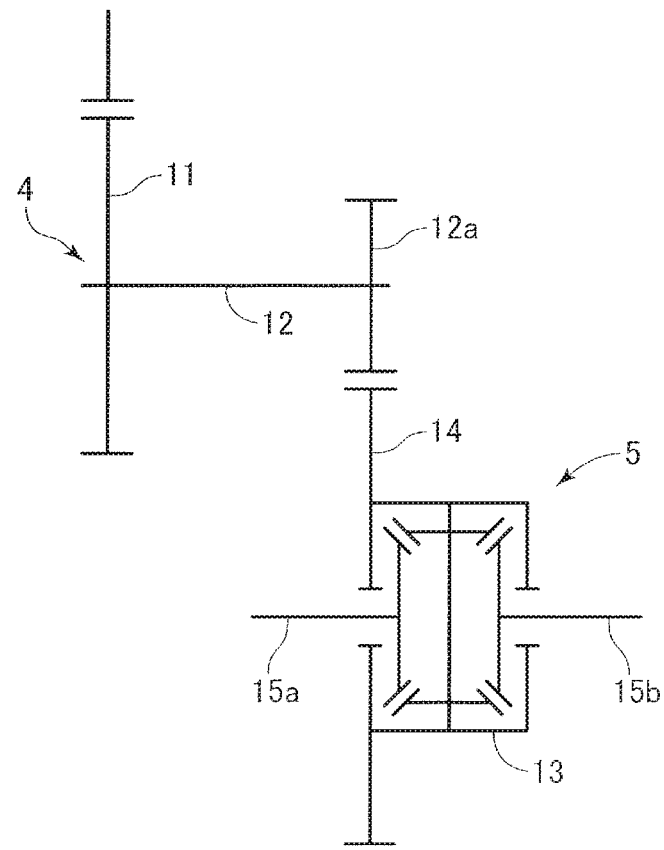

First, a schematic structure of the vehicle drive apparatus will be described with reference to FIG. 1. As illustrated in FIG. 1, an automatic transmission 1 that is a vehicle drive apparatus suitable for use in an FF type vehicle, for example, is provided at its front side with a torque converter 2 including a lock-up clutch 2a, and is provided at its rear side with a speed change mechanism 3, a counter shaft portion 4, and a differential portion 5.

The torque converter 2 is disposed around the axis of an input shaft 7A of the speed change mechanism 3 coaxial with an output shaft 10 of the engine (not illustrated), for example. The speed change mechanism 3 is disposed around the axis of a central shaft 7B (see FIG. 3) coaxially connected to the input shaft 7A. The counter shaft portion 4 is disposed on a counter shaft 12 that is located on an axis parallel to the input shaft 7A and the central shaft 7B. The differential portion 5 is disposed such that the differential portion 5 includes a left drive shaft 15a and a right drive shaft 15b located on an axis parallel to the counter shaft 12.

The skeleton diagram illustrated in FIG. 1 is a planar development of the automatic transmission 1. The input and central shafts 7A and 7B, the counter shaft 12, and the right and left drive shafts 15b and 15a have a triangular positional relationship in a side view.

The speed change mechanism 3 includes: the input shaft 7A to which rotation from the engine is transferred through the torque converter 2; and the central shaft 7B disposed rearward of the input shaft 7A and connected to the input shaft 7A. In other words, the automatic transmission 1 includes, in a broad sense, an input shaft 7 made up of the input shaft 7A and the central shaft 7B. The speed change mechanism 3 includes: a planetary gear DP on the input shaft 7A; and a planetary gear unit PU on the central shaft 7B.

The planetary gear DP includes: a first sun gear S1; a first carrier CR1; a first ring gear R1; a pinion gear P2 meshing with the first sun gear S1; and a pinion gear P1 meshing with the first ring gear R1. The pinion gear P1 and the pinion gear P2 mesh with each other at the first carrier CR1. Thus, the planetary gear DP is a so-called "double-pinion" planetary gear.

The planetary gear unit PU includes four rotational members, i.e., a second sun gear S2, a third sun gear S3, a second carrier CR2, and a second ring gear R2. The planetary gear unit PU further includes: a long pinion gear P3 meshing with the third sun gear S3 and the second ring gear R2; and a short pinion gear P4 meshing with the second sun gear S2. The long pinion gear P3 and the short pinion gear P4 mesh with each other at the second carrier CR2. Thus, the planetary gear unit PU is a so-called "Ravigneaux type" planetary gear unit.

Rotation of the first sun gear S1 of the planetary gear DP is locked relative to a case 6. The first carrier CR1 is connected to the input shaft 7A so as to make a rotation similar to a rotation of the input shaft 7A (hereinafter referred to as an "input rotation"), and is connected to a fourth clutch C-4. The first sun gear S1 whose rotation is locked and the first carrier CR1 that makes an input rotation cause the first ring gear R1 to make a decelerated rotation that is a decelerated input rotation. The first ring gear R1 is connected to a first clutch C-1 (clutch device) and a third clutch C-3.

The third sun gear S3 of the planetary gear unit PU is connected to a first brake B-1 and securable to the case 6. The third sun gear S3 is connected to the fourth clutch C-4 and the third clutch C-3 such that the input rotation of the first carrier CR1 may be input to the third sun gear S3 through the fourth clutch C-4 and the decelerated rotation of the first ring gear R1 may be input to the third sun gear S3 through the third clutch C-3. The second sun gear S2 is connected to the first clutch C-1 such that the decelerated rotation of the first ring gear R1 may be input to the second sun gear S2.

The second carrier CR2 is connected to a second clutch C-2 that receives the rotation of the input shaft 7A through the central shaft 7B, such that the input rotation may be input to the second carrier CR2 through the second clutch C-2. The second carrier CR2 is connected to a one-way clutch F-1 and a second brake B-2 such that rotation of the second carrier CR2 in one direction relative to the case 6 is restricted via the one-way clutch F-1 and rotation of the second carrier CR2 may be locked via the second brake B-2. The second ring gear R2 is connected to a counter gear 8 rotatably supported by a center support member 19 (see FIG. 3) secured to a transmission case.

The counter gear 8 meshes with a counter driven gear 11 secured onto the counter shaft 12 of the counter shaft portion 4. The counter shaft 12 meshes with a gear 14 of the differential portion 5 through an output gear 12a provided on the outer peripheral surface of the counter shaft 12. The gear 14 is secured to a differential gear 13 and connected to the left drive shaft 15a and the right drive shaft 15b through the differential gear 13.

The automatic transmission 1 structured as described above includes the first to fourth clutches C-1 to C-4, the first and second brakes B-1 and B-2, and the one-way clutch F-1 illustrated in the skeleton diagram of FIG. 1. As illustrated in the engagement table of FIG. 2A and the velocity diagram of FIG. 2B, the automatic transmission 1 selectively engages a plurality of friction engagement elements, i.e., the first to fourth clutches C-1 to C-4, the first and second brakes B-1 and B-2, and the one-way clutch F-1. Thus, the automatic transmission 1 controls the rotation states of a plurality of rotational elements, i.e., the first to third sun gears S1 to S3, the first to fourth pinion gears P1 to P4, the first and second ring gears R1 and R2, and the first and second carriers CR1 and CR2, so as to achieve first to eighth forward shift speeds (1st to 8th) and first and second reverse shift speeds (Rev1 and Rev2). This changes the speed of rotation input to the input shaft 7 and rotates the counter gear 8 accordingly, so that the resulting rotation is output to the counter shaft portion 4.

Next, the structure of the rear side portion of the automatic transmission 1 (i.e., the structure of the speed change mechanism 3) will be described in detail with reference to FIG. 3. The speed change mechanism 3 includes, in its center, the central shaft 7B in spline engagement with the input shaft 7A. The front portion of the central shaft 7B is rotatably supported by the case 6 via the input shaft 7A. The rear portion of the central shaft 7B is rotatably supported by a boss of the case 6 via a needle bearing.

The central shaft 7B is provided on its outer periphery with the above-described planetary gear unit PU disposed around the central shaft 7B and axially opposite to the center support member 19 relative to the counter gear 8. Specifically, a sleeve 31 (first rotational member) extending toward the second axial side from the body of the second sun gear S2 (gear) is disposed on the outer periphery of the central shaft 7B such that the sleeve 31 is rotatable relative to the central shaft 7B via a bushing b1. In other words, the sleeve 31 is disposed on the first axial side of the input shaft 7A.

The sleeve 31 is provided at its front side with a spline 31s (first spline). A first peripheral surface 31a is provided on the first axial side relative to the spline 31s, i.e., rearward of the spline 31s. A first step 31b that is a radial step is provided between the spline 31s and the first peripheral surface 31a. The sleeve 31 is provided with a third peripheral surface 31c on the first axial side of the first peripheral surface 31a and in alignment with the first peripheral surface 31a. The third peripheral surface 31c is a smooth peripheral surface having a low surface roughness.

The sleeve 31 is in spline engagement with a spline 32s (second spline) of a connecting member 32 (second rotational member) coupled to the above-described first clutch C-1 (see FIG. 1), thus providing a spline engagement portion S.

The connecting member 32 is provided with the spline 32s on the inner peripheral surface of a radially outwardly thickened thick portion 32g. The connecting member 32 includes a thin portion 32b on the first axial side of the thick portion 32g. The thin portion 32b is smaller in radial thickness than the thick portion 32g. The inner peripheral surface of the thin portion 32b is provided with a groove 33 radially recessed relative to the first peripheral surface 31a. In other words, the groove 33 is recessed from the radially inner side toward the radially outer side. A tolerance ring 40 (described below) is disposed in the groove 33. The connecting member 32 is provided with the spline 32s and the groove 33 located axially side by side. Note that the spline 32s and the groove 33 of the connecting member 32 do not necessarily have to be provided adjacent to each other. The spline 32s and the groove 33 are only required to be provided such that the spline 32s and the groove 33 are axially adjacent to each other as viewed in the radial direction. The spline 32s and the groove 33 may be provided at positions radially different from those occupied on the connecting member 32.

The thin portion 32b is provided with the groove 33, and the thick portion 32g is provided with the spline 32s that provides the spline engagement portion S. Thus, durability to withstand a torque transferred from the spline 31s of the sleeve 31 can be improved compared to the case where the thin portion 32b of the connecting member 32 is provided with the spline 32s.

The speed change mechanism 3 is structured such that the second sun gear S2 is connected to the first clutch C-1, serving as a predetermined friction engagement element, through the spline engagement portion S that provides spline engagement between the spline 31s of the sleeve 31 and the spline 32s of the connecting member 32. The groove 33 is provided axially opposite to the first clutch C-1 relative to the spline 32s of the connecting member 32, so that the groove 33 is located outside a path leading from the second sun gear S2 to the first clutch C-1 through the spline engagement portion S. This allows the thin portion 32b smaller in radially outer thickness than the thick portion 32g to define a portion of the speed change mechanism 3 where the groove 33 of the connecting member 32 is to be provided. Thus, the speed change mechanism 3 is reduced in radial size.

The connecting member 32 includes a fitting portion 32e on the first axial side of the groove 33. The fitting portion 32e has a low surface roughness and is fitted to the third peripheral surface 31c of the sleeve 31. Fitting the fitting portion 32e to the third peripheral surface 31c enables the automatic transmission 1 to support the connecting member 32 with higher accuracy. The accuracy in supporting the connecting member 32 increases as the surface roughness of the fitting portion 32e and the surface roughness of the third peripheral surface 31c decrease.

The groove 33 is provided in the connecting member 32 such that a second peripheral surface 32a facing the first peripheral surface 31a is defined by the bottom surface of the groove 33 located between a first lateral surface 33b extending radially from the thin portion 32b of the connecting member 32 and a second lateral surface 33c axially facing the first lateral surface 33b, and the radial length between the first peripheral surface 31a and the second peripheral surface 32a is a first distance W1. The tolerance ring 40 is disposed in the groove 33. The tolerance ring 40 serves as an elastic member that comes into frictional contact with the first peripheral surface 31a of the sleeve 31 and the second peripheral surface 32a. Note that the first lateral surface 33b and the second lateral surface 33c do not necessarily have to be provided substantially radially parallel to each other. In one example, the first lateral surface 33b and the second lateral surface 33c each having an inverted V-shape may axially face each other.

Figure 3:
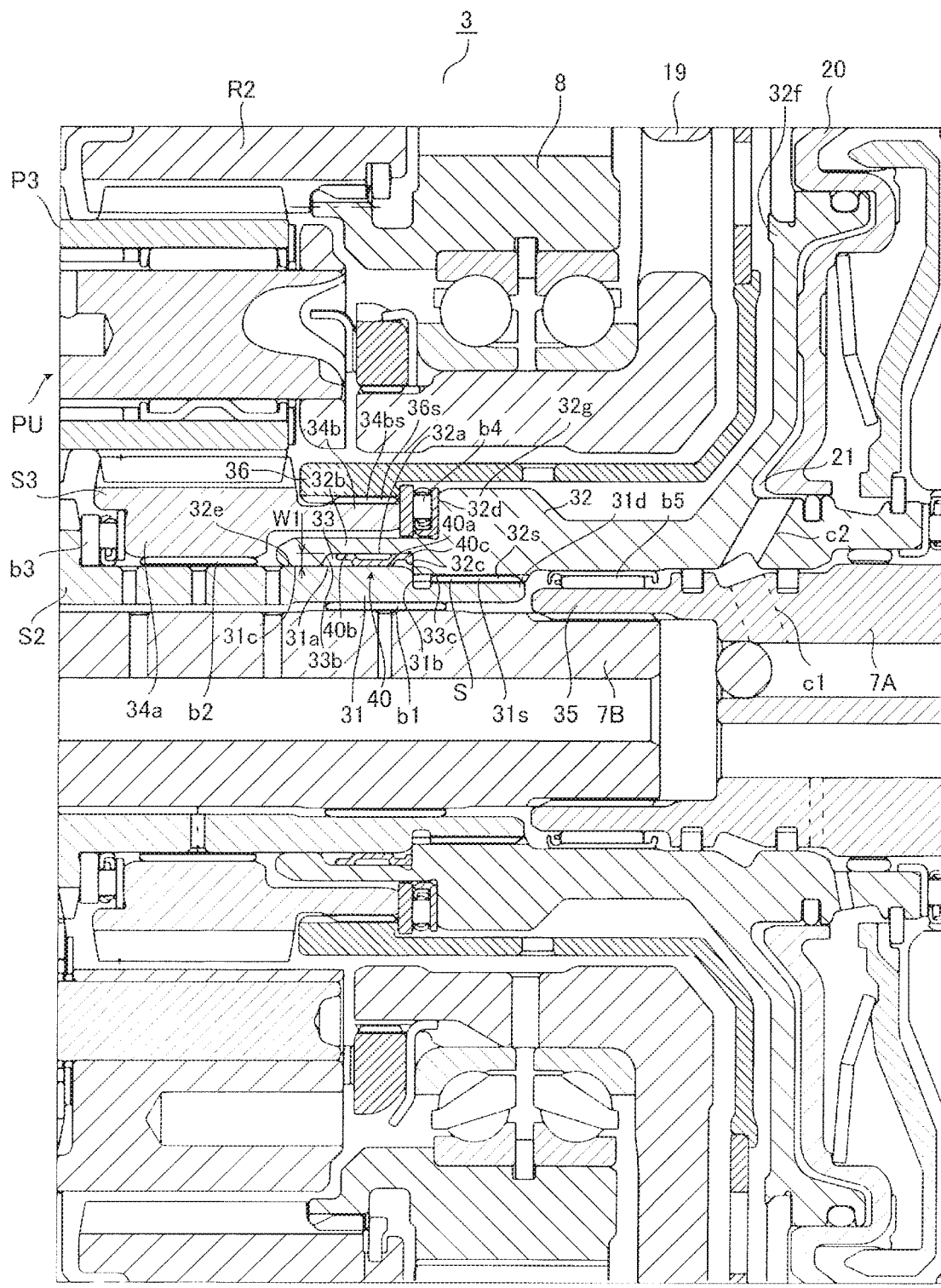
FIG. 3 is a partial sectional view of the automatic transmission according to the first embodiment.
Figure 4:
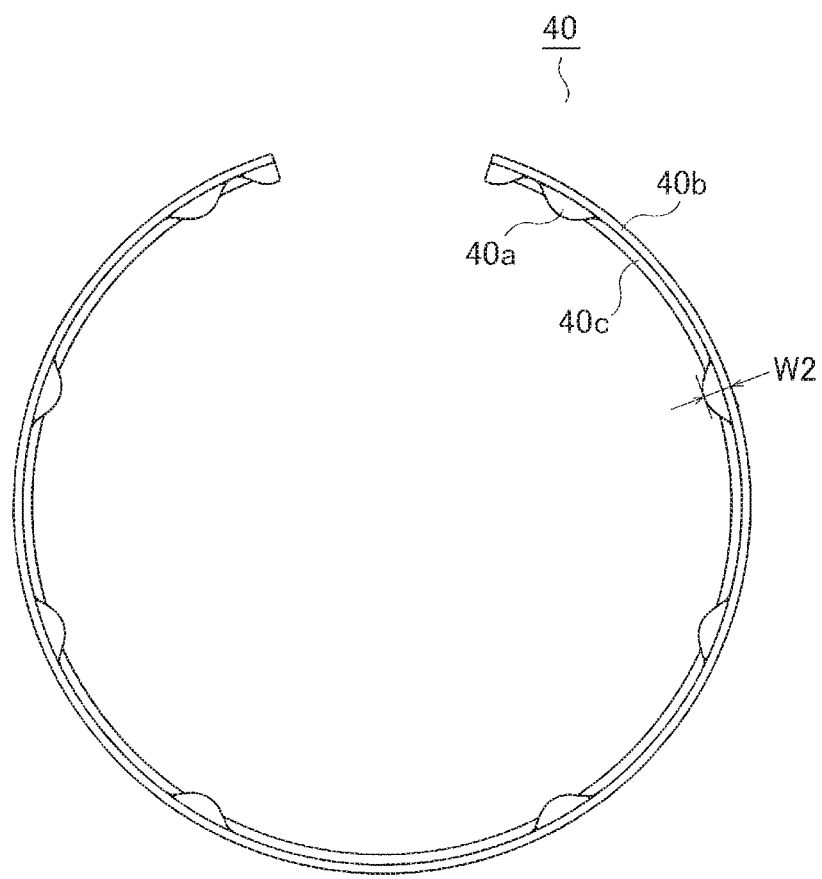
FIG. 4 is a front view of an elastic member according to the first embodiment.

FIG. 4 is a front view of the tolerance ring 40 that is not attached to the groove 33, i.e., the tolerance ring 40 that is not elastically deformed. As illustrated in FIG. 4, an axially extending elastic portion 40b of the tolerance ring 40 is radially bent so as to provide radially uniform convex and concave portions. Thus, when the tolerance ring 40 is attached to the groove 33 and elastically deformed, a protruding surface 40a (first contact portion) protruding radially inward comes into frictional contact with the first peripheral surface 31a, and the elastic portion 40b (second contact portion) having a radial thickness comes into frictional contact with the second peripheral surface 32a. As illustrated in FIG. 3, the tolerance ring 40 causes the sleeve 31 and the connecting member 32 to come into engagement with each other by a frictional force between the protruding surface 40a and the first peripheral surface 31a and a frictional force between the elastic portion 40b and the second peripheral surface 32a. The frictional forces are produced owing to the elastic force of the tolerance ring 40 resulting from the elastic deformation thereof. As illustrated in FIG. 3, each of the axial ends of the tolerance ring 40 serves as the elastic portion 40b.

When the tolerance ring 40 is not attached to the groove 33, the tolerance ring 40 is curved such that the radial length between the elastic portion 40b and the protruding surface 40a is a second distance W2. One of the axial ends of the tolerance ring 40, i.e., the second axial end of the tolerance ring 40 attached to the groove 33, is an extension 40c that extends radially.

In this embodiment, the second distance W2 is longer than the first distance W1 that is the radial length between the first peripheral surface 31a and the second peripheral surface 32a illustrated in FIG. 3. This allows the tolerance ring 40 to radially elastically deform with reliability when the tolerance ring 40 is attached to the groove 33, so that the protruding surface 40a comes into frictional contact with the first peripheral surface 31a. Thus, the automatic transmission 1 causes the sleeve 31 and the connecting member 32 to come into engagement with each other by the frictional force between the protruding surface 40a and the first peripheral surface 31a and the frictional force between the elastic portion 40b and the second peripheral surface 32a, which are produced owing to the elastic force of the tolerance ring 40 resulting from frictional contact of the elastic portion 40b with the second peripheral surface 32a. This engagement makes it possible to reduce occurrence of backlash between the sleeve 31 and the connecting member 32.

The spline 32s and the groove 33 of the connecting member 32 are provided side by side. A second step 32c that is a radial step is provided between the spline 32s and the groove 33. In this embodiment, the second step 32c of the connecting member 32 is in abutment with the first step 31b of the sleeve 31. Thus, when the connecting member 32 is assembled to the automatic transmission 1, the second step 32c abuts against the first step 31b so as to enable positioning of the connecting member 32.

The third peripheral surface 31c of the sleeve 31 is fitted to the fitting portion 32e of the connecting member 32 on the first axial side of the groove 33, and the first step 31b is in abutment with the second step 32c on the second axial side of the groove 33. Thus, disposing the tolerance ring 40 in the groove 33 enables the automatic transmission 1 to allow positioning of the tolerance ring 40. The automatic transmission 1 is capable of preventing the tolerance ring 40 disposed in the groove 33 from moving out of the groove 33 and into an undesirable position in the automatic transmission 1 owing to excessive load or repeated load, for example. In addition, if a load applied to the tolerance ring 40 causes axial movement of the tolerance ring 40, the elastic portion 40b of the tolerance ring 40 having a radial thickness would abut against the first lateral surface 33b or the second lateral surface 33c, thus enabling the automatic transmission 1 to restrict axial movement of the tolerance ring 40.

The connecting member 32 includes the groove 33 at a location away from a torque transfer path extending from the third sun gear S3 to the first clutch C-1 through the spline engagement portion S. Specifically, the second spline is provided between the first clutch C-1 and the groove 33, and the connecting member 32 comes into engagement with the sleeve 31 via the tolerance ring 40 disposed in the groove 33. This results in an improvement in durability to withstand a torque transferred from the spline 31s of the sleeve 31.

The connecting member 32 includes a radially outwardly extending wall 32d provided at a position radially different from the position of the spline 32s, i.e., radially outward of the spline 32s and located on an outer peripheral surface of the connecting member 32. The wall 32d defines the first axial end face of the thick portion 32g. The position of the wall 32d is not limited to a position radially outward of the spline 32s. The wall 32d may be provided radially outward of the groove 33. In this case, the connecting member 32 is structured such that a portion of the groove 33 is defined by the thick portion 32g.

The connecting member 32 is extended toward the second axial side (the front side), and a hydraulic servo 20 of the first clutch C-1 is disposed at the front side toward which the connecting member 32 is extended. The first clutch C-1 includes: friction plates including inner and outer friction plates; and the hydraulic servo 20 to connect and disconnect the friction plates. The friction plates are disposed outward of a drum-like member connected to the first ring gear R1, and the hydraulic servo 20 is disposed inward of the friction plates. The first clutch C-1 includes a clutch drum 32f that contains the hydraulic servo 20. The connecting member 32 is a shaft member integrally extending from the clutch drum 32f serving as a friction member of the first clutch C-1 that contains the hydraulic servo 20.

The tolerance ring 40 is attached to a portion of the automatic transmission 1 located between the sleeve 31, including at its first axial side the second sun gear S2 whose radius of rotation is the smallest among the elements of the planetary gear DP and the planetary gear unit PU of the speed change mechanism 3, and the connecting member 32 that is a shaft member integrally extending from the clutch drum 32f. This means that explosive vibration from the engine is likely to be transferred to the input shaft 7A and the central shaft 7B coupled thereto, so that the members of the automatic transmission 1 supported by the input shaft 7A and the central shaft 7B and adjacent thereto are susceptible to the explosive vibration. The connecting member 32 is in spline engagement with the sleeve 31 including at its first axial side the second sun gear S2 that is a rotational element most susceptible to the explosive vibration of the engine because of its small radius of rotation, so that vibration of the connecting member 32 may be amplified when the vibration is transferred. The automatic transmission 1, however, is structured such that the sleeve 31 and the connecting member 32 are brought into engagement with each other by the elastic force of the tolerance ring 40. Thus, if the first clutch C-1 is disengaged, the automatic transmission 1 is able to decrease the vibration of the connecting member 32 so as to reduce generation of sounds. Because the vibration of the connecting member 32 is decreased when the first clutch C-1 is disengaged, vibration transferred from the second sun gear S2 to the first clutch C-1 is also reduced.

The third sun gear S3 (third rotational member) having a sleeve-like shape is disposed outward of the sleeve 31 so as to be rotatable relative to the central shaft 7B via a bushing b2. The third sun gear S3 includes an extension 34b extended from a body 34a having a tooth surface formed on its radially outer periphery toward the second axial side (i.e., the front side) so as to reach a position where the extension 34b faces the wall 32d of the connecting member 32 and is located radially outward of the groove 33 of the connecting member 32. A thrust bearing b3 disposed on the first axial side restricts axial movement of the third sun gear S3 relative to the second sun gear S2 and thus effects axial positioning of the third sun gear S3 relative to the second sun gear S2. A thrust bearing b4 that is a bearing member disposed between the wall 32d and the extension 34b restricts axial movement of the third sun gear S3 relative to the connecting member 32 and thus effects axial positioning of the third sun gear S3 relative to the connecting member 32.

The automatic transmission 1 allows the thrust bearing b4 to be disposed at a position where the thrust bearing b4 axially overlaps with the spline engagement portion S, which provides spline engagement between the sleeve 31 and the connecting member 32, as viewed in the radial direction. This prevents an increase in axial size of the automatic transmission 1, although the automatic transmission 1 allows disposition of the tolerance ring 40 that enables engagement between the sleeve 31 and the connecting member 32 in spline engagement with each other. When the wall 32d is provided radially outward of the groove 33, the thrust bearing b4 is disposed at a position where the thrust bearing b4 axially overlaps with the groove 33 as viewed in the radial direction. Also in this case, the automatic transmission 1 achieves effects similar to those achieved when the wall 32d is provided radially outward of the spline engagement portion S.

The automatic transmission 1 is structured to allow disposition of the tolerance ring 40 on the first axial side of the spline engagement portion S. This enables an end 35, i.e., the first axial end, of the input shaft 7A in spline engagement with the central shaft 7B to be disposed adjacent to an end 31d of the sleeve 31 located at the second axial side thereof. The input shaft 7A rotatably supports the connecting member 32 via a needle bearing b5 disposed between the outer periphery of the end 35 and the connecting member 32.

As described above, the fitting portion 32e of the connecting member 32 having a low surface roughness and provided on the first axial side of the groove 33 is fitted to the third peripheral surface 31c having a low surface roughness. The connecting member 32 is supported by the input shaft 7A via the needle bearing b5 on the second axial side of the spline engagement portion S. The automatic transmission 1 having such a structure enables the second sun gear S2 and the connecting member 32 to be disposed substantially coaxially, thus making it possible to reduce whirling vibration of the first clutch C-1 and the connecting member 32 coupled to the first clutch C-1 in a drivable manner.

The automatic transmission 1 enables the needle bearing b5 for rotatably supporting the connecting member 32 to be disposed on the end 35 of the input shaft 7A adjacent to the sleeve 31. Thus, an oil passage c2 of the connecting member 32 is provided close to an oil passage c1 of the input shaft 7A so as to supply, through the oil passages c1 and c2, hydraulic oil to a hydraulic oil chamber 21 of the hydraulic servo 20 to connect and disconnect the first clutch C-1. When hydraulic oil supplied from the oil passage c1 of the input shaft 7A is supplied to the hydraulic oil chamber 21 of the hydraulic servo 20 through the oil passage c2 of the connecting member 32, the oil passage c1 and the oil passage c2 are connectable without the use of any other member, such as a bushing, located between the input shaft 7A and the connecting member 32 and provided for the sole purpose of defining an oil passage. This structure leads to a reduction in the number of components of the automatic transmission 1, resulting in cost reduction.

As described above with reference to FIG. 2B, when the automatic transmission 1 achieves the eighth forward speed that is the highest shift speed, the second sun gear S2 is rotated at the highest speed among a plurality of rotational elements included in the planetary gear DP and the planetary gear unit PU that are components of the speed change mechanism 3, so that the second sun gear S2 is rotated twice or more as fast as the input shaft 7A. This means that when the automatic transmission 1 achieves the eighth forward speed, the sleeve 31 including at its first axial side the second sun gear S2 and the connecting member 32 in spline engagement with the sleeve 31 are rotated at the highest speed among the rotational elements with the exception of the second sun gear S2.

Thus, the automatic transmission 1 includes the second sun gear S2 that rotates at the highest speed when the automatic transmission 1 achieves the highest shift speed. Using the elastic force of the tolerance ring 40, the sleeve 31 that rotates twice or more as fast as the input shaft 7 is connected to the connecting member 32 that is in spline engagement with the sleeve 31 via the spline engagement portion S and thus rotates at a high speed together with the sleeve 31. This makes it possible to reduce vibrations created between the sleeve 31 and the connecting member 32 in spline engagement with each other via the spline engagement portion S, resulting in a reduction in generation of sounds.

Figures 2A, 2B:
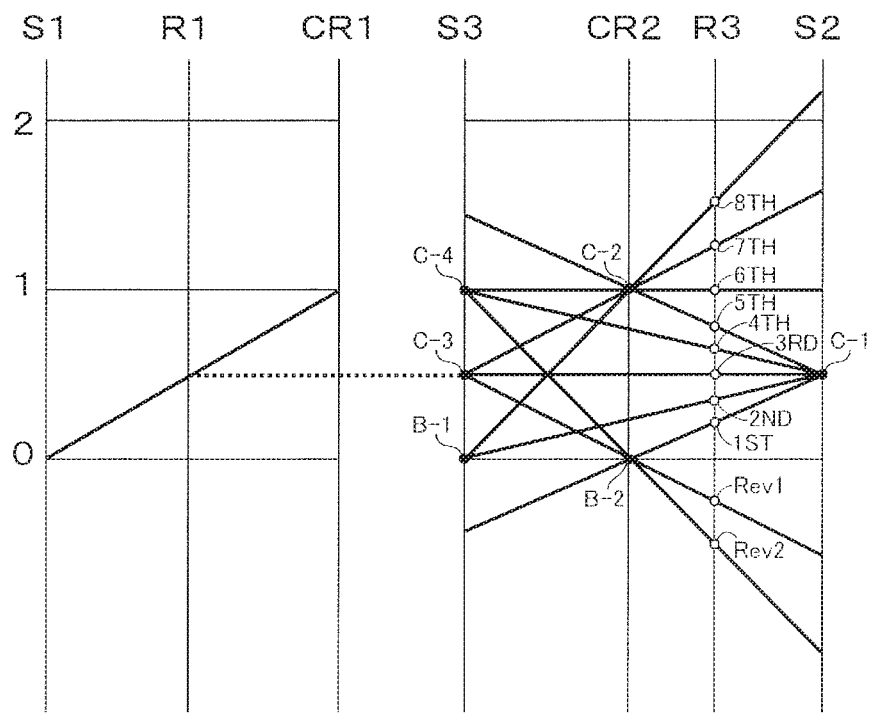
FIG. 2A is an engagement table for the automatic transmission according to the first embodiment.
FIG. 2B is a velocity diagram of the automatic transmission according to the first embodiment.

As illustrated in FIG. 2A, the first clutch C-1 is disengaged when the automatic transmission 1 achieves the sixth to eighth forward speeds. Thus, when the automatic transmission 1 achieves the sixth to eighth forward speeds, the third pinion gear P3 coupled to the second sun gear S2 in a drivable manner causes free rotation of the sleeve 31 including at its first axial side the second sun gear S2 and the connecting member 32 in spline engagement with the sleeve 31. The sleeve 31 and the connecting member 32, however, are connected to each other by the elastic force of the tolerance ring 40. This makes it possible to reduce vibrations created between the sleeve 31 and the connecting member 32 in spline engagement with each other via the spline engagement portion S, resulting in a reduction in generation of sounds.

Figure 5:
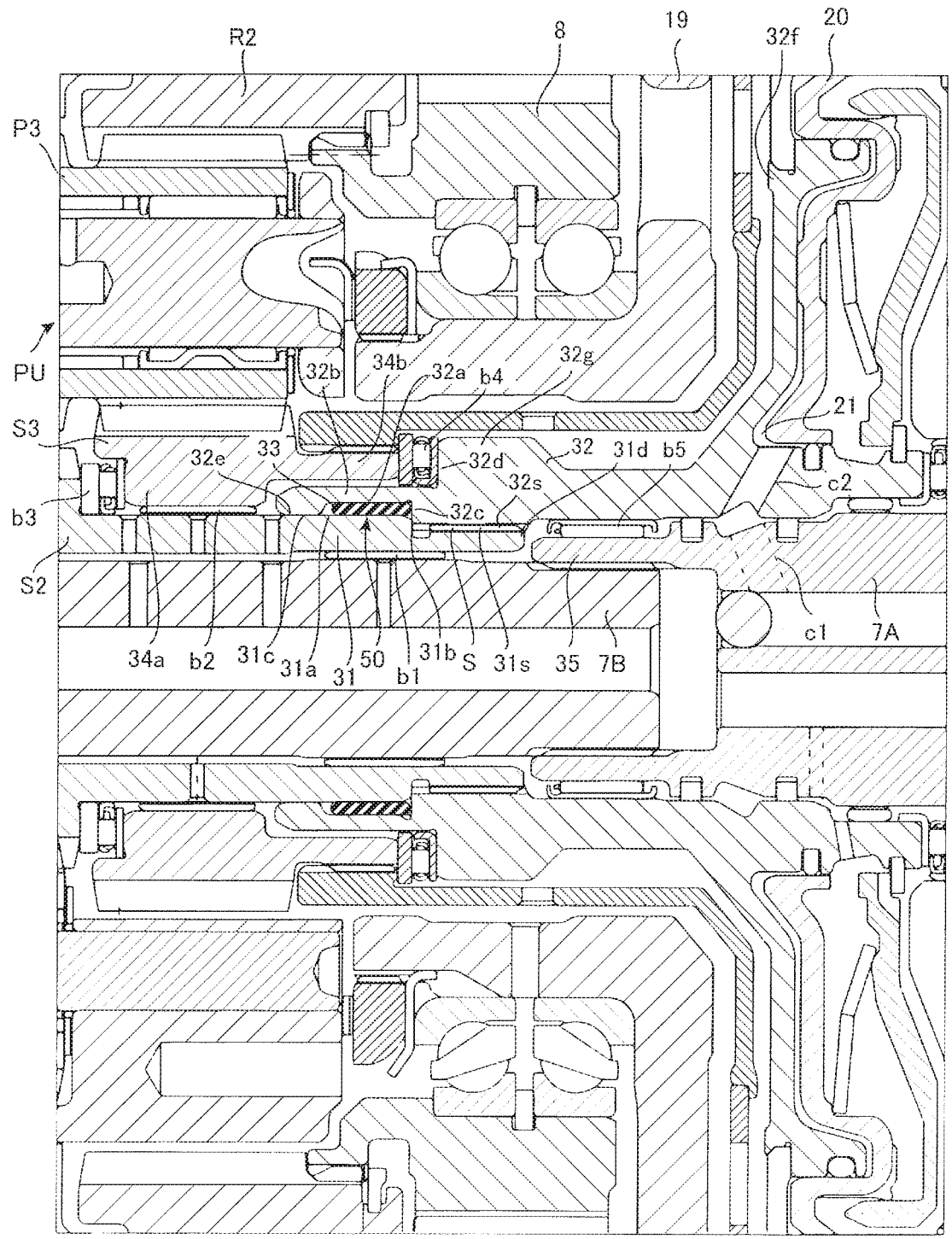
FIG. 5 is a sectional view of a variation of the automatic transmission according to the first embodiment.
Figure 6:
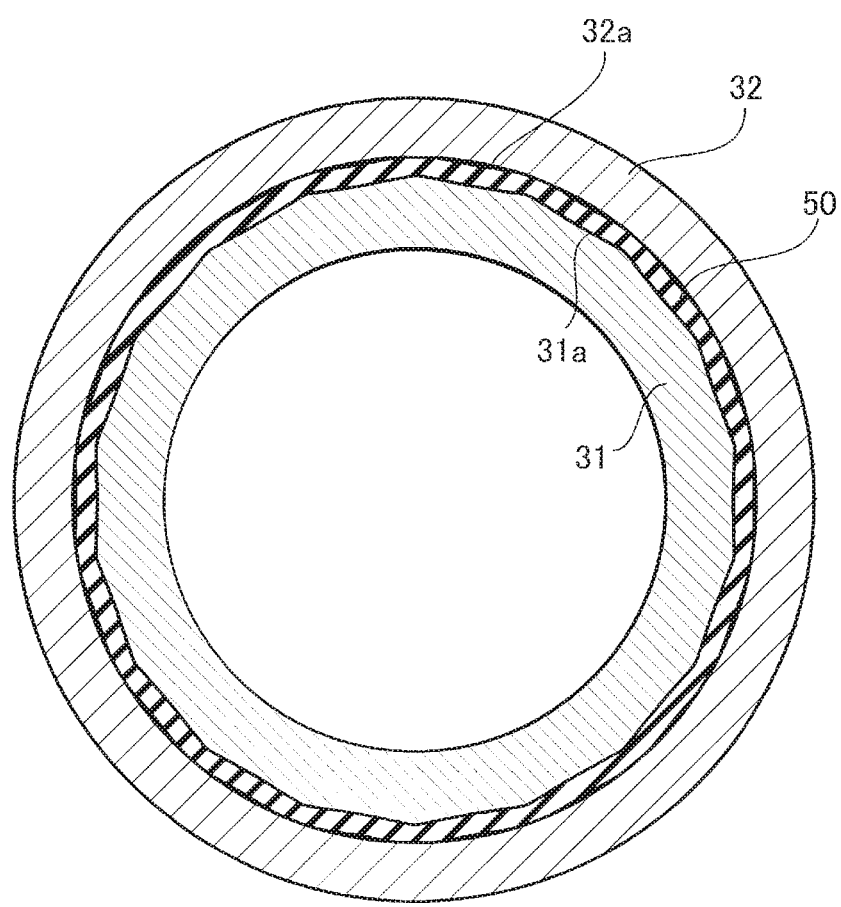
FIG. 6 is a schematic front view of a variation of the automatic transmission according to the first embodiment.

Although in this embodiment, the automatic transmission 1 including the tolerance ring 40 serving as the elastic member has been described by way of example, the elastic member is not limited to the tolerance ring 40. In one example, the elastic member may be a member, such as a ring-shaped rubber ring 50 illustrated in FIG. 5, that comes into frictional contact with the first peripheral surface 31a and the second peripheral surface 32a so as to provide engagement between the sleeve 31 and the connecting member 32 by the elastic force of this member. When the rubber ring 50 provides engagement between the sleeve 31 and the connecting member 32, the first peripheral surface 31a of the sleeve 31 is formed into a polygonal shape as illustrated in FIG. 6. Thus, frictional resistance between the rubber ring 50 and the first peripheral surface 31a is increased. This makes it possible to keep the rubber ring 50 from rotating between the first peripheral surface 31a and the second peripheral surface 32a so as to prevent weakening of engagement provided between the sleeve 31 and the connecting member 32 by the rubber ring 50. The shape of the first peripheral surface 31a is not limited to a polygonal shape. One example involves performing machining to provide a large number of axially extending grooves, for instance, so as to increase the surface roughness of the first peripheral surface 31a and increase frictional resistance between the rubber ring 50 and the first peripheral surface 31a, thus making it possible to prevent rotation of the rubber ring 50. Similarly to the first peripheral surface 31a, the second peripheral surface 32a may also be subjected to machining to increase frictional resistance between the second peripheral surface 32a and the rubber ring 50.

Second Embodiment

Next, a drive apparatus according to a second embodiment will be described with reference to FIG. 7. A speed change mechanism 300 according to this embodiment differs from the speed change mechanism 3 according to the first embodiment in that a groove 330 has a structure not substantially hermetically sealed by a sleeve 310 and a connecting member 320. Other than this, the speed change mechanism 300 according to the second embodiment is similar in structure to the speed change mechanism 3 according to the first embodiment. Thus, similar elements are identified by the same reference signs, and detailed description thereof will be omitted.

Figure 7:
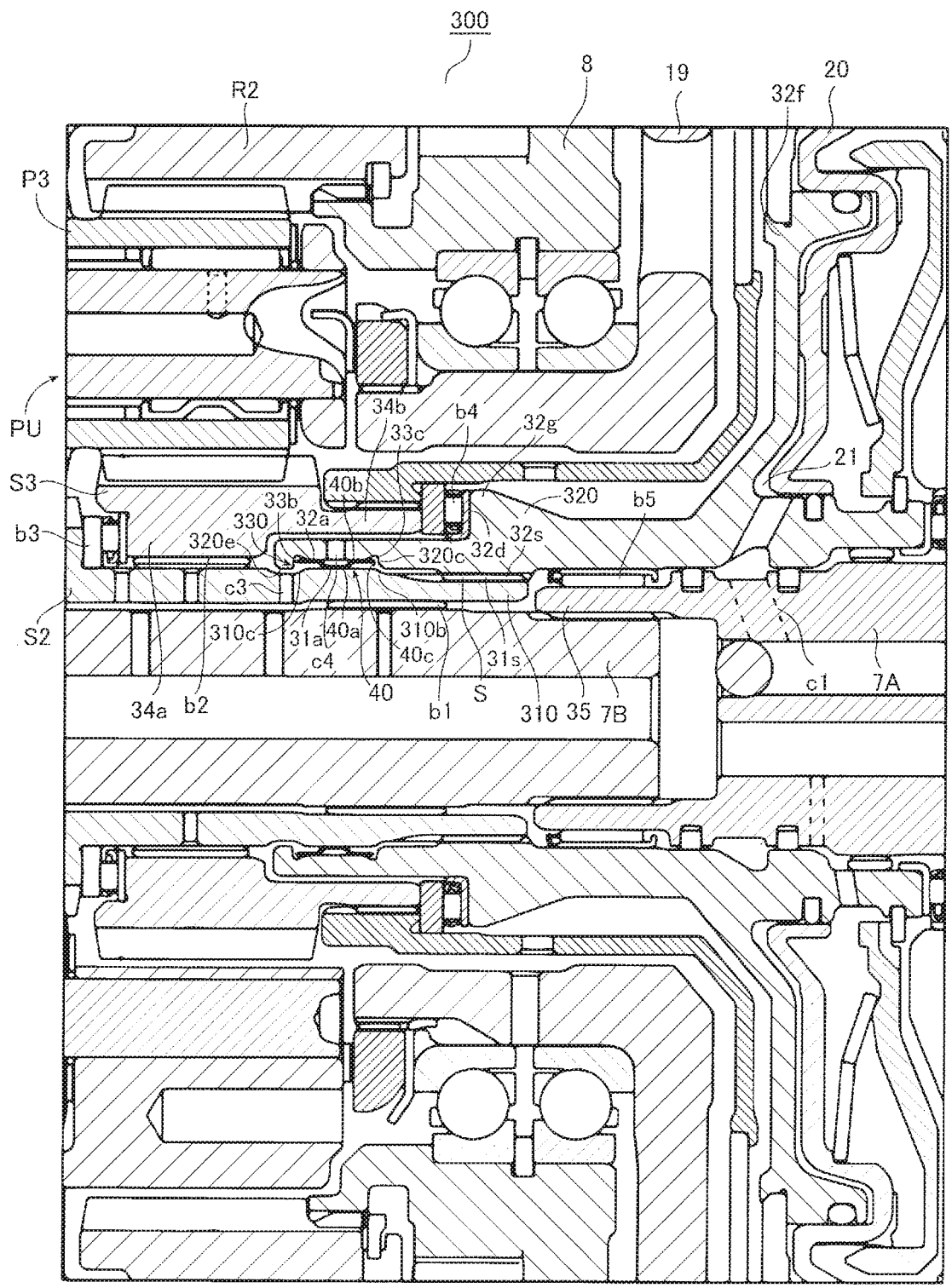
FIG. 7 is a sectional view of a variation of an automatic transmission according to a second embodiment.

In this embodiment, as illustrated in FIG. 7, a third peripheral surface 310c of the sleeve 310 is not in contact with a fitting portion 320e of the connecting member 320 on the first axial side, and a first step 310b of the sleeve 310 is not in contact with a second step 320c of the connecting member 320 on the second axial side. In other words, the connecting member 320 that includes the clutch drum 32f and is disposed radially outward of the sleeve 310 is not in contact with the sleeve 310 at portions of the connecting member 320 close to the axial ends of the groove 330.

Because the third peripheral surface 310c is not in contact with the fitting portion 320e, the speed change mechanism 300 enables lubricating oil to be supplied to the inside of the groove 330 through an oil passage c3 that is a first lubrication hole provided in the sleeve 310. Since the first step 310b is not in contact with the second step 320c of the connecting member 320, the speed change mechanism 300 enables the lubricating oil, which has been supplied to the inside of the groove 330, to be supplied to the spline engagement portion S. Owing to the fact that the portions of the connecting member 320 close to the axial ends of the groove 330 are not in contact with the sleeve 310, centrifugal force produced by rotation of the sleeve 310 and the connecting member 320 is exerted in a direction in which the elastic portion 40b of the tolerance ring 40 is pressed against the second peripheral surface 32a. This enables the speed change mechanism 300 to more reliably restrict axial movement of the tolerance ring 40.

As illustrated in FIG. 7, the connecting member 320 is provided radially outward of the sleeve 310, and there is provided an oil passage c4 that is a second lubrication hole located within an axial range in which the protruding surface 40a of the tolerance ring 40 is located, as viewed in the radial direction.

This structure enables the drive apparatus to supply lubricating oil to the groove 330, thus making it possible to prevent the wearing away of the tolerance ring 40.

Third Embodiment

Next, a drive apparatus according to a third embodiment will be described with reference to FIG. 8. A speed change mechanism 301 according to this embodiment differs from the speed change mechanism 3 according to the first embodiment and the speed change mechanism 300 according to the second embodiment in that a groove 331 is provided in a sleeve 311 including the second sun gear S2. Other than this, the speed change mechanism 301 according to the third embodiment is similar in structure to the speed change mechanism 3 according to the first embodiment and the speed change mechanism 300 according to the second embodiment. Thus, similar elements are identified by the same reference signs, and detailed description thereof will be omitted.

Figure 8:
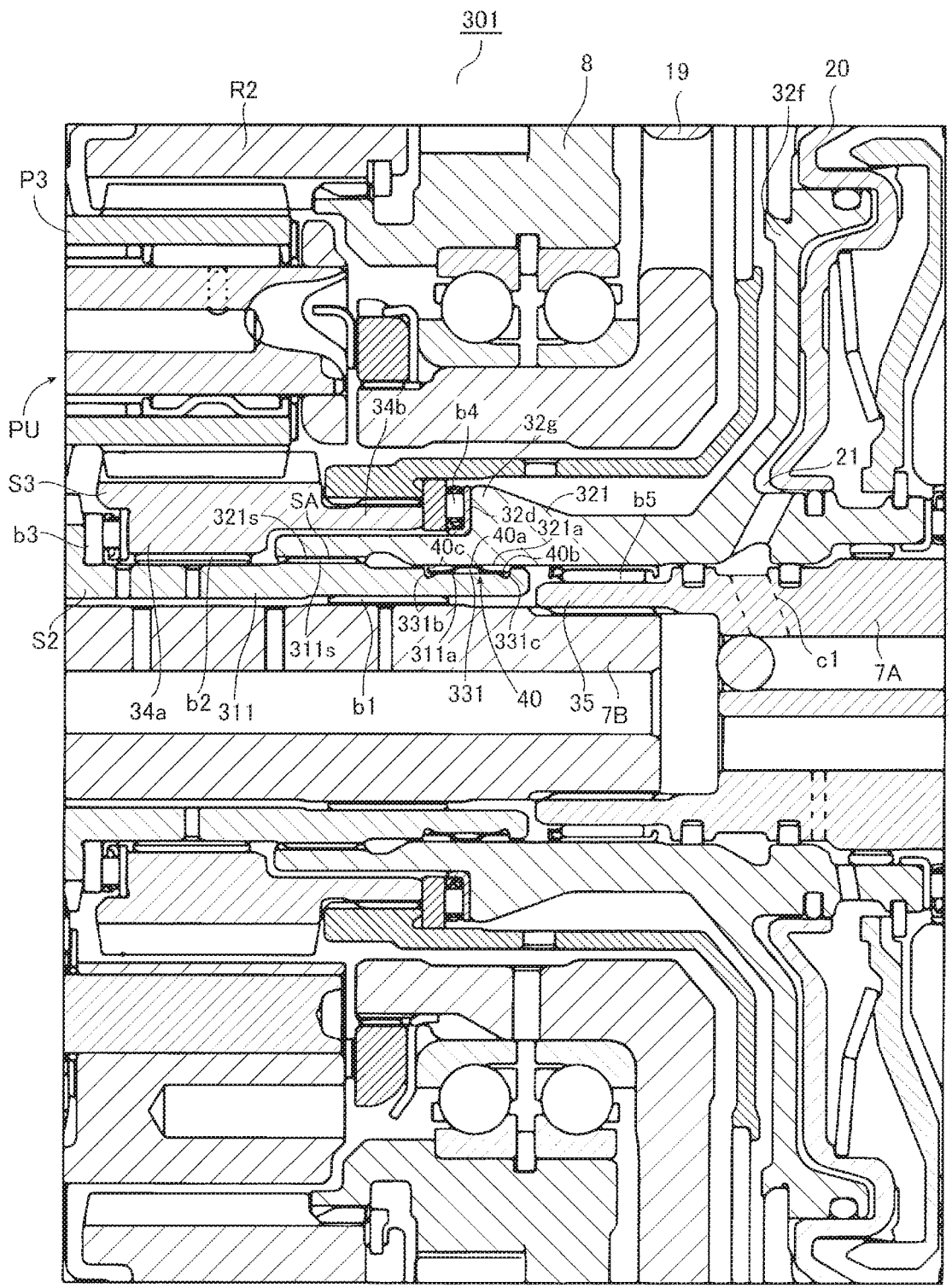
FIG. 8 is a sectional view of a variation of an automatic transmission according to a third embodiment.

In this embodiment, as illustrated in FIG. 8, a connecting member 321 (first rotational member) includes a first peripheral surface 321a provided side by side with a first spline 321s and located at the right side of FIG. 8 (first axial side). The sleeve 311 (second rotational member) includes: a second spline 311s that is in spline engagement with the first spline 321s so as to provide a spline engagement portion SA; and the groove 331 provided side by side with the second spline 311s, recessed radially relative to the first peripheral surface 321a, and including a bottom surface that is located between a first lateral surface 331b and a second lateral surface 331c facing the first lateral surface 331b and that serves as a second peripheral surface 311a radially facing the first peripheral surface 321a. The speed change mechanism 301 includes, in the groove 331, the tolerance ring 40 to exert a radial elastic force between the connecting member 321 and the sleeve 311. The elastic force of the tolerance ring 40 produces circumferential frictional resistance between the first peripheral surface 321a and the second peripheral surface 311a. The sleeve 311 is provided with the first spline 321s between the third sun gear S3 and the groove 331.

The drive apparatus structured as described above enables engagement between the rotational members, which come into spline engagement with each other, by the tolerance ring 40. This makes it possible to decrease backlash so as to reduce generation of sounds, and enables positioning of the tolerance ring 40 when the tolerance ring 40 is disposed in the groove 331.

SUMMARY OF THE EMBODIMENTS

As described above, the vehicle drive apparatus (1) includes:
- a first rotational member (31, 310, 321) including a first spline (31s, 321s), and a first peripheral surface (31a, 321a) provided axially side by side with the first spline (31s, 321s);
- a second rotational member (32, 311, 320) including a second spline (32s, 311s) in spline engagement with the first spline (31s, 321s) so as to provide a spline engagement portion (S, SA), and a groove (33, 331) provided axially side by side with the second spline (32s, 311s), recessed radially relative to the first peripheral surface (31a, 321a), and including a bottom surface that is located between a first lateral surface (33b, 331b) and a second lateral surface (33c, 331c) facing the first lateral surface (33b, 331b) and that serves as a second peripheral surface (32a, 311a) radially facing the first peripheral surface (31a, 321a); and
- an elastic member (40) disposed in the groove (33, 330, 331) so as to exert a radial elastic force between the first rotational member (31, 310, 321) and the second rotational member (32, 311, 320).

The elastic member (40) produces circumferential frictional resistance between the first peripheral surface (31a, 321a) and the second peripheral surface (32a, 311a) by the elastic force.

Thus, the disposition of the elastic member (40) in the groove (33, 330, 331) enables engagement between the rotational members, which come into spline engagement with each other, by the elastic member (40). This makes it possible to decrease backlash so as to reduce generation of sounds, and enables positioning of the elastic member (40) when the elastic member (40) is disposed in the groove (33, 330, 331).

The elastic member (40) of the vehicle drive apparatus (1) is structured such that before the elastic member (40) is attached to the groove (33, 330, 331), a radial length (W2) between a surface of the elastic member (40) to be in contact with the first peripheral surface (31a, 321a) and a surface of the elastic member (40) to be in contact with the second peripheral surface (32a, 311a) is longer than a radial length (W1) between the first peripheral surface (31a, 321a) and the second peripheral surface (32a, 311a). The elastic member (40) is elastically deformed when the elastic member (40) is attached to the groove (33, 330, 331).

Thus, when the elastic member (40) is attached to the groove (33, 330, 331), the elastic member (40) is radially elastically deformed with reliability so as to provide engagement between the first rotational member (31, 310, 321) and the second rotational member (32, 311, 320). This makes it possible to reduce backlash that occurs between the first rotational member (31, 310, 321) and the second rotational member (32, 311, 320).

The elastic member (40) of the vehicle drive apparatus (1) includes a first contact portion (40a) and a second contact portion (40b).

The first contact portion (40a) bends from the first contact portion (40a) toward the first peripheral surface (31a, 310a, 321a) so as to come into contact with the first peripheral surface (31a, 310a, 321a).

The second contact portion (40b) comes into contact with the second peripheral surface (32a, 311a, 320a).

Each of axial ends of the elastic member (40) is the second contact portion (40b).

Thus, if a load applied to the elastic member (40) causes axial movement of the elastic member (40), the second contact portion (40b) of the elastic member (40) abuts against the groove (33, 330, 331). This makes it possible to restrict axial movement of the elastic member (40).

The first rotational member (310) of the vehicle drive apparatus (1) includes a first lubrication hole (c3) through which oil is supplied to the groove (330).

The second rotational member (320) is provided radially outward of the first rotational member (310). The second rotational member (320) includes a second lubrication hole (c4) located within an axial range in which the first contact portion (40a) is located, as viewed in a radial direction.

This enables supply of lubricating oil to the groove (330), thus making it possible to prevent the wearing away of the elastic member (40).

One of the first rotational member (31, 310, 321) and the second rotational member (32, 311, 320) of the vehicle drive apparatus (1) is a rotational member that includes, at its first axial side, a gear (S2) rotatable with rotation of an input shaft (7) to receive rotation from a driving source, and that is provided at its second axial side with the first spline (31s, 321s) or the second spline (32s, 311s).

The other one of the first rotational member (31, 310, 321) and the second rotational member (32, 311, 320) includes a friction member (32f) of a predetermined friction engagement element (C-1).

Thus, engagement provided between the first rotational member (31, 310, 321) and the second rotational member (32, 311, 320) by the elastic member (40) makes it possible to reduce vibrations and sounds generated at the spline engagement portion (S, SA) when rotation received from the input shaft (7) is transferred to the second rotational member (32, 311, 320) through the first rotational member (31, 310, 321), with the predetermined friction engagement element (C-1) disengaged.

The second rotational member (32, 311, 320) of the vehicle drive apparatus (1) is provided with the second spline (32s, 311s) located between the gear (S2) of the second rotational member (32, 311, 320) or the friction member (32f) of the predetermined friction engagement element (C-1) and the groove (33, 330, 331) in an axial direction.

This makes it possible to reduce the radial thickness of a portion of the second rotational member (32, 311, 320) where the groove (33, 330) is provided, resulting in a reduction in radial size.

A portion of the second rotational member (320) of the vehicle drive apparatus (1) close to an axial end of the groove (330) is not in contact with the first rotational member (310).

When the second rotational member (320) includes the friction member (320 of the predetermined friction engagement element (C-1), the second rotational member (320) is disposed radially outward of the first rotational member (310).

Thus, centrifugal force produced by rotation of the first rotational member (310) and the second rotational member (320) is exerted in a direction in which the second contact portion (40b) of the elastic member (40) is pressed against the second peripheral surface (32a). This makes it possible to more reliably restrict axial movement of the elastic member (40).

The vehicle drive apparatus (1) includes:
a speed change mechanism (3, 300, 301) that includes a plurality of rotational elements (31, 32, 310, 311, 320, 321, S1 to S3, P1 to P4, R1, R2, CR1, CR2), and a plurality of friction engagement elements (C-1 to C-4, B-1, B-2, F-1) coupled to the plurality of rotational elements (31, 32, 310, 311, 320, 321, S1 to P4, R1, R2, CR1, CR2) in a drivable manner, and that selectively engages the plurality of friction engagement elements (C-1 to C-4, B-1, B-2, F-1) so as to control rotation states of the plurality of rotational elements (31, 32, 310, 311, 320, 321, S1 to S3, P1 to P4, R1, R2, CR1, CR2), thus achieving a plurality of shift speeds; and
the input shaft (7) that provides the rotation from the driving source to the speed change mechanism (3, 300, 301).

The gear (S2) is included in the plurality of rotational elements (31, 32, 310, 311, 320, 321, S1 to S3, P1 to P4, R1, R2, CR1, CR2).

The predetermined friction engagement element (C-1) is included in the plurality of friction engagement elements (C-1 to C-4, B-1, B-2, F-1).

When the predetermined friction engagement element (C-1) is disengaged, the gear (S2) causes free rotation of the first rotational member (31, 310, 321) and the second rotational member (32, 311, 320).

The rotation states of the first rotational member (31, 310, 321) and the second rotational member (32, 311, 320) include a state in which the first rotational member (31, 310, 321) and the second rotational member (32, 311, 320) rotate faster than the input shaft (7) when the predetermined friction engagement element (C-1) is disengaged and the free rotation is caused by the gear (S2).

Thus, the first rotational member (31, 310, 321) and the second rotational member (32, 311, 320), whose rotation states include the state in which the first rotational member (31, 310, 321) and the second rotational member (32, 311, 320) rotate faster than the input shaft (7) when the predetermined friction engagement element (C-1) is disengaged and the free rotation is caused by the gear (S2), are connected to each other by the elastic force of the elastic member (40). This makes it possible to decrease vibrations created between the first rotational member (31, 310, 321) and the second rotational member (32, 311, 320) in spline engagement with each other via the spline engagement portion (S, SA), resulting in a reduction in generation of sounds.

The first rotational member (31, 310, 321) and the second rotational member (32, 311, 320) of the vehicle drive apparatus (1) are able to rotate at the highest speed among the plurality of rotational elements (31, 32, 310, 311, 320, 321, S1 to S3, P1 to P4, R1, R2, CR1, CR2).

Thus, the first rotational member (31, 310, 321) and the second rotational member (32, 311, 320) that are able to rotate at the highest speed among the plurality of rotational elements (31, 32, 310, 311, 320, 321, S1 to S3, P1 to P4, R1, R2, CR1, CR2) are connected to each other by the elastic force of the elastic member (40). This makes it possible to decrease vibrations created between the first rotational member (31, 310, 321) and the second rotational member (32, 311, 320) in spline engagement with each other via the spline engagement portion (S, SA), resulting in a reduction in generation of sounds.

The vehicle drive apparatus (1) includes:
a speed change mechanism (3, 300, 301) that includes a plurality of rotational elements (31, 32, 310, 311, 320, 321, S1 to S3, P1 to P4, R1, R2, CR1, CR2), and a plurality of friction engagement elements (C-1 to C-4, B-1, B-2, F-1) coupled to the plurality of rotational elements (31, 32, 310, 311, 320, 321, S1 to S3, P1 to P4, R1, R2, CR1, CR2) in a drivable manner, and that selectively engages the plurality of friction engagement elements (C-1 to C-4, B-1, B-2, F-1) so as to control rotation states of the plurality of rotational elements (31, 32, 310, 311, 320, 321, S1 to S3, P1 to P4, R1, R2, CR1, CR2), thus achieving a plurality of shift speeds; and
the input shaft (7) that provides the rotation from the driving source to the speed change mechanism (3, 300, 301).

The gear (S2) is included in the plurality of rotational elements (31, 32, 310, 311, 320, 321, S1 to S3, P1 to P4, R1, R2, CR1, CR2).

The predetermined friction engagement element (C-1) is included in the plurality of friction engagement elements (C-1 to C-4, B-1, B-2, F-1) and is disengaged when the speed change mechanism (3, 300, 301) achieves the highest shift speed.

When the speed change mechanism (3, 300, 301) achieves the highest shift speed, the gear (S2) causes free rotation of the first rotational member (31, 310, 321) and the second rotational member (32, 311, 320).

Thus, the first rotational member (31, 310, 321) and the second rotational member (32, 311, 320), whose free rotation is caused by the gear (S2) when the speed change mechanism (3, 300, 301) achieves the highest shift speed and the predetermined friction engagement element (C-1) is disengaged, are connected to each other by the elastic force of the elastic member (40). This makes it possible to decrease vibrations created between the first rotational member (31, 310, 321) and the second rotational member (32, 311, 320) in spline engagement with each other via the spline engagement portion (S, SA), resulting in a reduction in generation of sounds.

The gear (S2) of one of the first rotational member (31, 310, 321) and the second rotational member (32, 311, 320) of the vehicle drive apparatus (1) is a sun gear of a planetary gear (PU).

The predetermined friction engagement element (C-1) is a clutch device (C-1) including a clutch drum (320 containing a hydraulic servo (20).

The first rotational member (31, 310, 321) or the second rotational member (32, 311, 320) including the predetermined friction engagement element (C-1) is a shaft member integrally extending from the clutch drum (320 of the predetermined friction engagement element (C-1).

One of the first rotational member (31, 310, 321) and the second rotational member (32, 311, 320) includes at its first axial side the gear (S2) that is a rotational element most susceptible to explosive vibration of an engine because of its small radius of rotation. The other one of the first rotational member (31, 310, 321) and the second rotational member (32, 311, 320) including the predetermined friction engagement element (C-1) is in spline engagement with the one of the first rotational member (31, 310, 321) and the second rotational member (32, 311, 320), so that vibration of the other one of the first rotational member (31, 310, 321) and the second rotational member (32, 311, 320) may be amplified when the vibration is transferred. Providing engagement between the first rotational member (31, 310, 321) and the second rotational member (32, 311, 320) by the elastic force of the elastic member (40), however, makes it possible to decrease the vibration of the other one of the first rotational member (31, 310, 321) and the second rotational member (32, 311, 320), resulting in a reduction in generation of sounds. Because the vibration of the second rotational member (32, 311, 320) is reduced, vibration transferred from the gear (S2) to the clutch device (C-1) is also reduced.

Although in the first to third embodiments described above, the automatic transmission 1 that achieves, for example, eight forward speeds and two reverse speeds has been described by way of example, the exemplary embodiment is not limited to this structure. In one example, the automatic transmission 1 may achieve six forward speeds and a reverse speed.

Although the tolerance ring 40 is disposed between the sleeve 31 and the connecting member 32 in the first embodiment, the exemplary embodiment is not limited to this structure. The tolerance ring 40 is only required to be disposed between rotational members in spline engagement with each other. In particular, the tolerance ring 40 is preferably disposed between two rotational members that rotate faster than the input shaft 7 at each shift speed achieved by the speed change mechanism 3. In one example, the tolerance ring 40 may be disposed between the extension 34b of the third sun gear S3 that rotates faster than the input shaft 7 at the fifth forward speed and a connecting member 36 that includes a spline 36s in spline engagement with a spline 34bs of the extension 34b and that is coupled at its second axial side to the third clutch C-3.

In the first to third embodiments, the automatic transmission 1 that is connected only to the engine has been described. In one example, however, the automatic transmission 1 may be a hybrid vehicle drive apparatus equipped with a motor generator instead of the torque converter 2.

INDUSTRIAL APPLICABILITY

The vehicle drive apparatus is mountable on a vehicle, such as a passenger car or a truck. The vehicle drive apparatus is particularly suitable for use when the vehicle drive apparatus is required to reduce backlash and generation of sounds caused by spline engagement between rotational members that rotate at a high speed.

The invention claimed is:
1. A vehicle drive apparatus comprising:
a first rotational member including
a first spline, and
a first peripheral surface provided axially side by side with the first spline;
a second rotational member including
a second spline in spline engagement with the first spline so as to provide a spline engagement portion, and
a groove provided axially side by side with the second spline, recessed radially relative to the first peripheral surface, and including a bottom surface that is located between a first lateral surface and a second lateral surface facing the first lateral surface and that serves as a second peripheral surface radially facing the first peripheral surface; and an elastic member disposed in the groove so as to exert a radial elastic force between the first rotational member and the second rotational member, wherein the elastic member produces circumferential frictional resistance between the first peripheral surface and the second peripheral surface by the elastic force, and one of the first rotational member and the second rotational member is provided on a radially inner side, the one of the first rotational member and the second rotational member provided on the radially inner side has a lubrication hole for supplying oil to the groove, wherein the elastic member is structured such that before the elastic member is attached to the groove, a radial length between a surface of the elastic member to be in contact with the first peripheral surface and a surface of the elastic member to be in contact with the second peripheral surface is longer than a radial length between the first peripheral surface and the second peripheral surface, and the elastic member is elastically deformed when the elastic member is attached to the groove;

wherein the elastic member includes a first contact portion and a second contact portion, the first contact portion bends from the second contact portion toward the first peripheral surface so as to come into contact with the first peripheral surface, the second contact portion comes into contact with the second peripheral surface, and each of axial ends of the elastic member is the second contact portion; and wherein the first rotational member is provided on the radially inner side and includes the lubrication hole through which oil is supplied to the groove, the second rotational member is provided radially outward of the first rotational member, and the second rotational member includes a second lubrication hole located within an axial range in which the first contact portion is located, as viewed in a radial direction.

2. The vehicle drive apparatus according to claim 1, wherein one of the first rotational member and the second rotational member is a rotational member that includes, at its first axial side, a gear rotatable with rotation of an input shaft to receive rotation from a driving source, and that is provided at its second axial side with the first spline or the second spline, and the other one of the first rotational member and the second rotational member includes a friction member of a friction engagement element.

3. The vehicle drive apparatus according to claim 2, wherein the second rotational member is provided with the second spline located between the gear or the friction engagement element of the second rotational member and the groove in an axial direction.

4. The vehicle drive apparatus according to claim 3, wherein a portion of the second rotational member close to an axial end of the groove is not in contact with the first rotational member, and when the second rotational member includes the friction member of the friction engagement element, the second rotational member is disposed radially outward of the first rotational member.

5. The vehicle drive apparatus according to claim 4, comprising:

a speed change mechanism that includes a plurality of rotational elements, and a plurality of friction engagement elements coupled to the plurality of rotational elements in a drivable manner, and that selectively engages the plurality of friction engagement elements so as to control rotation states of the plurality of rotational elements, thus achieving a plurality of shift speeds; and the input shaft that provides the rotation from the driving source to the speed change mechanism, wherein the gear is included in the plurality of rotational elements, the friction engagement element is included in the plurality of friction engagement elements, when the friction engagement element is disengaged, the gear causes free rotation of the first rotational member and the second rotational member, and the rotation states of the first rotational member and the second rotational member include a state in which the first rotational member and the second rotational member rotate faster than the input shaft when the friction engagement element is disengaged and the free rotation is caused by the gear.

6. The vehicle drive apparatus according to claim 5, wherein the first rotational member and the second rotational member are able to rotate at the highest speed among the plurality of rotational elements.

7. The vehicle drive apparatus according to claim 6, wherein the friction engagement element is disengaged when the speed change mechanism achieves the highest shift speed.

8. The vehicle drive apparatus according to claim 7, wherein the gear of one of the first rotational member and the second rotational member is a sun gear of a planetary gear, the friction engagement element is a clutch device including a clutch drum containing a hydraulic servo, and the other one of the first rotational member and the second rotational member including the friction engagement element is a shaft member integrally extending from the clutch drum of the friction engagement element.

9. A vehicle drive apparatus comprising:

a first rotational member including
  a first spline, and
  a first peripheral surface provided axially side by side with the first spline;

a second rotational member including
  a second spline in spline engagement with the first spline so as to provide a spline engagement portion, and
  a groove provided axially side by side with the second spline, recessed radially relative to the first peripheral surface, and including a bottom surface that is located between a first lateral surface and a second lateral surface facing the first lateral surface and that serves as a second peripheral surface radially facing the first peripheral surface; and an elastic member disposed in the groove so as to exert a radial elastic force between the first rotational member and the second rotational member, wherein the elastic member produces circumferential frictional resistance between the first peripheral surface and the second peripheral surface by the elastic force, and one of the first rotational member and the second rotational member is provided on a radially inner side, the one of the first rotational member and the second rotational member provided on the radially inner side has a lubrication hole for supplying oil to the groove, wherein the elastic member includes a first contact portion and a second contact portion, the first contact portion bends from the second contact portion toward the first peripheral surface so as to come into contact with the first peripheral surface, the second contact portion comes into contact with the second peripheral surface, and each of axial ends of the elastic member is the second contact portion, and wherein one of the first rotational member and the second rotational member is a rotational member that includes, at its first axial side, a gear rotatable with rotation of an input shaft to receive rotation from a driving source, and that is provided at its second axial side with the first spline or the second spline, and the other one of the first rotational member and the second rotational member includes a friction member of a friction engagement element.

10. The vehicle drive apparatus according to claim 9, wherein the second rotational member is provided with the second spline located between the gear or the friction engagement element of the second rotational member and the groove in an axial direction.

11. The vehicle drive apparatus according to claim 1, wherein one of the first rotational member and the second rotational member is a rotational member that includes, at its first axial side, a gear rotatable with rotation of an input shaft to receive rotation from a driving source, and that is provided at its second axial side with the first spline or the second spline, and the other one of the first rotational member and the second rotational member includes a friction member of a friction engagement element.

12. The vehicle drive apparatus according to claim 11, wherein the second rotational member is provided with the second spline located between the gear or the friction engagement element of the second rotational member and the groove in an axial direction.

13. A vehicle drive apparatus comprising:

a first rotational member including
a first spline, and
a first peripheral surface provided axially side by side with the first spline;

a second rotational member including
a second spline in spline engagement with the first spline so as to provide a spline engagement portion, and
a groove provided axially side by side with the second spline, recessed radially relative to the first peripheral surface, and including a bottom surface that is located between a first lateral surface and a second lateral surface facing the first lateral surface and that serves as a second peripheral surface radially facing the first peripheral surface; and an elastic member disposed in the groove so as to exert a radial elastic force between the first rotational member and the second rotational member, wherein the elastic member produces circumferential frictional resistance between the first peripheral surface and the second peripheral surface by the elastic force, wherein the elastic member includes a first contact portion and a second contact portion, the first contact portion bends from the second contact portion toward the first peripheral surface so as to come into contact with the first peripheral surface, the second contact portion comes into contact with the second peripheral surface, each of axial ends of the elastic member is the second contact portion, the first rotational member includes a first lubrication hole through which oil is supplied to the groove, the second rotational member is provided radially outward of the first rotational member, and the second rotational member includes a second lubrication hole located within an axial range in which the first contact portion is located, as viewed in a radial direction.

14. A vehicle drive apparatus comprising:

a first rotational member including
a first spline, and
a first peripheral surface provided axially side by side with the first spline;

a second rotational member including
a second spline in spline engagement with the first spline so as to provide a spline engagement portion, and
a groove provided axially side by side with the second spline, recessed radially relative to the first peripheral surface, and including a bottom surface that is located between a first lateral surface and a second lateral surface facing the first lateral surface and that serves as a second peripheral surface radially facing the first peripheral surface; and an elastic member disposed in the groove so as to exert a radial elastic force between the first rotational member and the second rotational member, wherein the elastic member produces circumferential frictional resistance between the first peripheral surface and the second peripheral surface by the elastic force, wherein one of the first rotational member and the second rotational member is a rotational member that includes, at its first axial side, a gear rotatable with rotation of an input shaft to receive rotation from a driving source, and that is provided at its second axial side with the first spline or the second spline, and the other one of the first rotational member and the second rotational member includes a friction member of a friction engagement element.

* * * * *